(12) United States Patent
Hibben

(10) Patent No.: US 8,334,346 B2
(45) Date of Patent: Dec. 18, 2012

(54) LOW TEMPERATURE CURABLE ADHESIVE COMPOSITIONS

(76) Inventor: Quentin Lewis Hibben, Elburn, IL (US)

( * ) Notice: Subject to any disclaimer, the term of this patent is extended or adjusted under 35 U.S.C. 154(b) by 0 days.

(21) Appl. No.: 13/007,635

(22) Filed: Jan. 16, 2011

(65) Prior Publication Data

US 2012/0184681 A1 Jul. 19, 2012

(51) Int. Cl.
C08L 83/00 (2006.01)
C08F 30/04 (2006.01)

(52) U.S. Cl. .............. 525/274; 525/242; 525/288

(58) Field of Classification Search .............. None
See application file for complete search history.

(56) References Cited

U.S. PATENT DOCUMENTS

| | | | |
|---|---|---|---|
| 3,558,574 A * | 1/1971 | Doehnert | 428/355 CN |
| 4,537,940 A * | 8/1985 | Omura et al. | 526/278 |
| 4,569,879 A * | 2/1986 | Groves | 428/198 |
| 4,721,757 A * | 1/1988 | Schindler | 525/245 |
| 4,898,899 A * | 2/1990 | Isobe | 524/90 |
| 4,906,684 A * | 3/1990 | Say | 524/548 |
| 5,064,719 A | 11/1991 | Den Hartog et al. | |
| 5,077,324 A | 12/1991 | Kistner et al. | |
| 5,096,783 A | 3/1992 | Liu et al. | |
| 5,141,983 A * | 8/1992 | Hasegawa et al. | 524/457 |
| 5,157,072 A | 10/1992 | Hense et al. | |
| 5,194,486 A * | 3/1993 | Levine et al. | 524/556 |
| 5,288,767 A | 2/1994 | Cramer et al. | |
| 5,294,688 A * | 3/1994 | Rehmer et al. | 526/260 |
| 5,356,996 A * | 10/1994 | Nakao et al. | 525/158 |
| 5,516,933 A * | 5/1996 | Fujiwa et al. | 560/178 |
| 5,643,994 A | 7/1997 | Kish et al. | |
| 5,663,266 A * | 9/1997 | Taylor et al. | 526/325 |
| 5,905,109 A * | 5/1999 | Shimizu et al. | 524/506 |
| 6,015,845 A | 1/2000 | Yonetani et al. | |
| 6,037,408 A | 3/2000 | Weber et al. | |
| 6,117,492 A * | 9/2000 | Goldstein et al. | 427/391 |
| 6,297,320 B1 | 10/2001 | Tang et al. | |
| 6,423,805 B1 * | 7/2002 | Bacho et al. | 526/319 |
| 6,433,097 B1 * | 8/2002 | Nixon et al. | 525/273 |
| 6,528,590 B1 * | 3/2003 | Beyer et al. | 525/227 |
| 6,538,062 B2 * | 3/2003 | Sasaki et al. | 524/833 |
| 6,583,259 B1 | 6/2003 | Weber et al. | |
| 6,624,243 B2 * | 9/2003 | Stark et al. | 524/832 |
| 6,858,299 B2 * | 2/2005 | Lundquist et al. | 428/402.21 |
| 7,214,737 B2 * | 5/2007 | Albalat Perez et al. | 524/804 |
| 7,244,775 B2 * | 7/2007 | Ilenda et al. | 523/202 |
| 7,244,793 B2 | 7/2007 | Liu et al. | |
| 7,273,524 B2 | 9/2007 | Tomita et al. | |
| 7,288,147 B2 | 10/2007 | Christensen et al. | |
| 7,411,010 B2 | 8/2008 | Kish et al. | |
| 7,494,764 B2 * | 2/2009 | Takahashi et al. | 430/286.1 |
| 7,544,739 B2 | 6/2009 | Liu et al. | |
| 7,638,563 B2 | 12/2009 | Nishikawa et al. | |
| 7,741,381 B2 | 6/2010 | Nakata et al. | |
| 7,789,149 B2 | 9/2010 | Santra et al. | |
| 7,812,090 B2 * | 10/2010 | Killilea et al. | 524/818 |
| 8,053,511 B2 * | 11/2011 | Muller et al. | 524/557 |
| 8,058,345 B2 | 11/2011 | Liu et al. | |
| 2003/0017348 A1 | 1/2003 | Brown | |
| 2004/0077782 A1 * | 4/2004 | Heldmann et al. | 524/804 |
| 2005/0250887 A1 | 11/2005 | Yang et al. | |
| 2006/0188714 A1 * | 8/2006 | Tetsumoto et al. | 428/355 AC |
| 2007/0191521 A1 | 8/2007 | Zhao | |
| 2008/0234405 A1 * | 9/2008 | Moszner et al. | 523/116 |
| 2010/0280198 A1 | 11/2010 | Bartley et al. | |
| 2011/0236612 A1 | 9/2011 | Kumru et al. | |
| 2012/0095131 A1 * | 4/2012 | Kinoshita et al. | 523/410 |

FOREIGN PATENT DOCUMENTS

| | | |
|---|---|---|
| WO | WO88-03599 A1 | 5/1988 |
| WO | WO 2010/114119 | 7/2010 |
| WO | WO 2010114119 A1 * | 10/2010 |

OTHER PUBLICATIONS

International Sch Rpt, May 8, 2012, PCT/US12/21129.

\* cited by examiner

*Primary Examiner* — Robert S Loewe

(74) *Attorney, Agent, or Firm* — Borson Law Group, PC

(57) ABSTRACT

The present invention is concerned with curable adhesive compositions for anchoring elements in a structural body that exhibit low temperature versus standard temperature degree of cures that are at least 50% or higher. The compositions include, in a first component, a reactive resin, an acetoacetoxy functional monomer and a silane monomer. By using phthalate-free constituents in the formulation, a further 10% increase in strength and durability of the resins at standard temperatures may be realized after curing at low temperatures.

13 Claims, No Drawings

LOW TEMPERATURE CURABLE ADHESIVE COMPOSITIONS

BACKGROUND OF THE INVENTION

1. Field of the Invention

The present invention relates to adhesive compositions suitable for anchoring or fixing elements in a base or structural body, and to methods of anchoring. More specifically, the present invention is directed towards adhesive compositions and methods that are especially well suited for curing such compositions at lower temperatures, without compromising desirable characteristics such as strength and durability.

2. Discussion of the Related Art

It is well known that adhesive systems are useful for fixing or anchoring materials in or to rock, masonry, and concrete. Such systems typically involve the use of synthetic resins and monomers that are maintained separately from a hardening or curing agent until they are combined at or near the point of fastening. A variety of additional and often optional adjuvants may also be used with adhesive systems.

By way of example, U.S. Pat. No. 5,157,072 to Hense, et al., teaches ethylenically unsaturated, substituted cycloaliphatic compounds as monomers and resins for minimizing shrinkage of the adhesive when used for anchoring bolts in bore holes. However, Hense, et al., is silent on low shrinkage stress. U.S. Pat. No. 5,288,767 to Cramer, et al., teaches a methacrylate monomer in the first component together with diluent monomers. One of the stated goals of this patent is to eliminate styrene as a co-monomer, but Cramer, et al., is silent on the subject of low-temperature curing. U.S. Pat. No. 6,037,408 to Weber, et al., is similar to the Cramer '767 patent, but it requires the use of very high levels of monomer and is silent on the affects of low temperature cure. Variously, U.S. Pat. No. 6,583,259, Weber, et al., is concerned with adhesives to bond to wet bore holes; U.S. Pat. No. 7,544,739, to Liu, et al. teaches a composition for use under conditions of elevated temperatures; and U.S. Pat. No. 5,077,324 to Kistner, et al., is concerned with extending the shelf life the formulation prior to use. Neither any of the foregoing, nor a great many other references are directed towards adhesive compositions that are suitable for curing at low temperatures.

It is often the case that adhesives must be applied to anchoring elements in concrete and masonry under adverse weather conditions involving low temperatures and/or excess moisture. Unfortunately, it is not until the arrival of warmer weather at some later point in time that weakness or failure of the anchoring elements are observed. The effects of warming the substrate have been largely ignored in the past. Often, products that are developed for cold environments make the assumption that the substrate will not warm appreciably. Another tactic that has often been employed is to produce multiple variations of a product where several closely related compositions are developed, each associated with a specific temperature range. Under new protocols, however, the costs for testing can be prohibitive for a product line with multiple adhesives.

SUMMARY OF THE INVENTION

In light of the foregoing, it is desirable to provide an adhesive composition that not only can be cured at low temperatures, but that also exhibits good strength and structural integrity over a wide range of temperature conditions. Moreover, another disadvantage of many adhesive compositions that are currently commercially available is that they contain or include phthalates. Phthalates, or phthalate esters, are often used in adhesive formulations as phlegmatizing agents to prevent the rapid and explosive reaction of certain curing agents when they are physically disturbed. Over concerns related to health reasons, however, phthalates are being phased out of many products in the United States, Canada, Europe and elsewhere in the world. Accordingly, it is desirable to provide an adhesive composition that does not include phthalates yet does not compromise safety.

The present invention provides an adhesive composition for anchoring materials in or to concrete or masonry that comprises from about 20% to 80% by weight of the entire composition of a reactive resin monomer/acetoacetoxy monomer/silane monomer solution; and a curing agent. In one aspect, the present invention provides a composition for anchoring materials in or to concrete or masonry that is made by mixing a first composition and a second composition. The first composition comprises from about 20% to 80% by weight of the entire composition of a reactive resin/acetoacetoxy monomer/silane monomer solution; in addition to an accelerant; inhibitor; and filler. The second composition comprises a curing agent; diluents as required to provide a phlegmatizing agent or flow; and filler.

According to another aspect, the present invention provides a phthalate-free composition for anchoring materials in or to concrete or masonry that is made by mixing a first composition and a second composition. The first composition comprises from about 20% to 80% by weight of the entire composition of a phthalate-free methacrylate monomer/acetoacetoxy monomer/silane monomer solution; in addition to an accelerant; an inhibitor; a filler and optional adjuncts. The second composition comprises a free radical initiator; phthalate-free diluents as required to provide a phlegmatizing agent or flow; and optional adjuncts.

DETAILED DESCRIPTION OF THE INVENTION

The present invention provides an adhesive composition for anchoring materials in or to concrete or masonry. The materials to be anchored in or to concrete or masonry include, but are not limited to: metallic objects such as steel rods and steel bolts; ceramics; other concrete or masonry members; plastics; glasses; and woods.

As indicated above, one of the motivating factors for the present invention was to develop an adhesive composition that cured at low temperatures without compromising strength of the adhesive. In the course of developing such a composition, it was also recognized that it might also be possible to impart other desirable features to the adhesive composition. Thus, it was postulated that the inclusion of a silane group, for example, might help promote adhesion of the composition to a cementitious substrate in wet or humid conditions. In addition, it was felt that an acetoacetoxy functional group might help promote adhesion of the composition to the insert, the substrate, or both. Under most conditions, these two monomers do not appear to significantly improve performance of an anchoring adhesive. Surprisingly, however, it was found that the presence of both an acetoacetoxy moiety and a silane moiety can provide a synergistic effect when curing takes place at low temperatures. Use of these monomers has unexpectedly resulted in demonstrably better curing at low temperatures. For instance, when acetoacetoxyethyl methacrylate and methacryloxypropyl trimethoxysilane (MPTMS) are used together in a first adhesive composition, a 20% improvement in mechanical strength has been observed when the adhesive was cured at low temperatures and then warmed to standard temperature.

Quite surprisingly, during the development of the inventive adhesive compositions described herein, it has also been discovered that the synergistic effect obtained upon the combination of silane and acetoacetoxy moieties is unexpectedly enhanced by the presence of a phthalate-free free radical initiator. Remarkably, the inventive adhesive compositions described herein have been shown to be curable at low temperatures, without any compromise as to strength, durability or structural integrity whether at low, moderate or elevated temperatures. In other words, the inventive silane-containing, and acetoacetoxy-containing compositions described herein, which can additionally be prepared phthalate-free, may be cured at low temperatures and yet retain the ability to perform at least as well as—if not better than—commercially available adhesive compositions, whether at low, moderate or elevated temperatures. The use of phthalate-free components in the inventive formulations can result in an approximately 10% increase in strength and durability characteristics following cure at low temperatures.

Reactive Resin

In discussing resins and monomers herein, it is to be understood that these terms may be used interchangeably. The molecules which are often referred to as resins are in reality high molecular weight monomers, from a chemistry standpoint. However, the terms resin and monomer are often used interchangeably in the adhesives trade and thus the terms are used without chemical distinction herein. No limitation(s) are intended or implied in the inventive adhesive compositions based on such terminology.

The inventive adhesive compositions comprise, in a first component or first composition, at least one synthetic resin or polymerizable monomer selected from among: acrylate monomers; allylic resins; bismaleimide resins; epoxy acrylate resins; epoxy methacrylate resins; methacrylate monomers; phenolic-based acrylates; phenolic-based methacrylates; unsaturated polyester resins; urethane acrylate resins; urethane methacrylate resins; and vinyl ester resins. In one embodiment, one of the synthetic resins is preferably an alkoxylated bisphenol or a novolac compound having one or more functional acrylate or methacrylate groups. A novolac—also spelled novolak—is a phenol-aldehyde condensation prepolymer obtained by condensing phenolic monomers with a stoichiometric deficiency of aldehydes.

In one aspect, an adhesive composition of the present invention includes at least one polymerizable monomer that contains or includes at least one functional group selected from among: acrylates; methacrylates; as well as combinations thereof; in combination with a phenolic selected from among; bisphenol A; bisphenol F; bisphenol S; novolac monomers; and combinations thereof. In a preferred aspect of the invention, the reactive resin includes an alkoxy group. In a more preferred aspect of the invention, the alkoxy group(s) is positioned in the reactive resin between the phenolic and the acrylate or methacrylate group(s). Especially preferred for use with the present invention are alkoxylated methacrylates and alkoxylated dimethacrylates, with ethoxylated bisphenol A dimethacrylate being particularly preferred.

Ethoxylated bisphenol A dimethacrylate resins with no more than 4 mole ethoxylation are particularly suitable for use in the first composition of the inventive adhesive formulations of the present invention. Degrees of condensation of ethylene oxide groups from about 1.0 mole to about 4.0 mole are preferred, with an average degree of condensation of about 2.0 mole to above 4.0 mole being more preferred. This resin is difunctional and has relatively few ethoxylate groups, thus it has good crosslink density, which results in high mechanical strength. This monomer also has a high glass transition temperature, $T_g$, which allows for higher end use temperatures of the adhesive. It also has a very high molecular weight and subsequently exhibits very low shrinkage stress. Without being bound by theory, the ethoxylate groups are believed to help promote adhesion to cementitious substrates.

Diluent Monomer

Diluent monomers, also called reactive diluents, are often used in adhesive compositions to bring the viscosity of a reaction mixture into a desirable range. Such diluents are also used to incorporate functionality to improve the adhesion of these compositions to the insert, the substrate, or both. Both multifunctional and monofunctional diluents may be used with the low temperature curable compositions of the present invention. Multifunctional diluents can be used to impart greater crosslink density which can improve chemical resistance, moisture tolerance and performance at higher use temperatures. Accordingly, either liquid or solid reactive organic diluents may be used with the reactive resins described herein to provide viscosity control, impart functionality, and/or increase the cross-linking density of the reaction mixture; as such, use of diluent monomers is only required for reaction mixtures in which the afore mentioned properties must be altered. If a diluent monomer is used it is therefore desirable that the diluent monomer contain at least one functional group that is reactive with the polymerizable monomer described above. High molecular weight is also desirable in a diluent monomer; high molecular weight minimizes shrinkage stress and imparts low volatility. Reactive diluents are optional for the present invention; however, those reactive diluents suitable for use with the adhesive compositions of the present invention include ethylenically unsaturated monomers. Among ethylenically unsaturated monomer diluents that can be used with the present invention, it is preferred that the reactive organic diluent include at least one monofunctional monomer to lower viscosity and at least one multifunctional monomer to increase crosslink density. As with the reactive resin, polar groups such as alkoxylates; carbonyls; ether linkages; ester linkages; hydroxyls; amines; and amides are believed to improve adhesion to the substrate.

As indicated above, monofunctional monomers may also be used with the inventive adhesive formulations. Suitable monofunctional monomers for use with the present invention include, but are not limited to: methyl methacrylate, isopropyl methacrylate, isobutyl methacrylate, tert-butyl methacrylate, steryl methacrylate, 2-phenoxyethyl methacrylate, tetrahydrofurfuryl methacrylate, glycidyl methacrylate, isobornyl methacrylate, hydroxyethyl methacrylate, hydroxypropyl methacrylate, hydroxybutyl methacrylate, benzyl methacrylate, dicyclopentyl methacrylate, tert-butyl acrylate, steryl acrylate, 2-phenoxyethyl acrylate, tetrahydrofurfuryl acrylate, isobornyl acrylate, hydroxybutyl methacrylate, benzyl acrylate, dicyclopentyl acrylate, and the like, as well as combinations thereof.

Multifunctional monomers that are suitable for use with the present invention include, but are not limited to: ethylene glycol dimethacrylate, diethlyene glycol dimethacrylate, triethylene glycol dimethacrylate, dipropylene glycol dimethacrylate, 1,3-butylene glycol dimethacrylate, 1,4-butanediol dimethacrylate, 1,6-hexanediol dimethacrylate, neopentyl glycol dimethacrylate, cyclohexane dimethanol dimethacrylate, dicyclopentyl dimethacrylate, glyceryl trimethacrylate, trimethylolpropane trimethacrylate, pentaerythritol trimethacrylate, pentaerythritol tetramethacrylate, dipentaerythritol pentamethacrylate, ethylene glycol diacrylate, diethlyene glycol diacrylate, triethylene glycol diacrylate, dipropylene glycol diacrylate, 1,3-butylene glycol diacrylate, 1,4-butanediol diacrylate, 1,6-hexanediol diacrylate, neopentyl glycol diacrylate, cyclohexane dimethanol diacrylate, dicyclopentyl diacrylate, glyceryl triacrylate, trimethylolpropane triacrylate, pentaerythritol triacrylate, pentaerythritol tetraacrylate, dipentaerythritol pentaacrylate, tris (2-hydroxy ethyl)isocyanurate triacrylate, alkoxylated variations of the foregoing monomers, and the like, as well as any combinations thereof. Additionally metallic acrylates and methacrylates can be use to increase crosslink density these include, but are not limited to acrylates and methacrylates of zinc, magnesium and calcium.

Other monomers, such as vinyl, allylic and acrylamide monomers may also be used. Examples of these monomers which can be used with the present invention include, but are not limited to: styrene; vinyl toluene; methyl styrene; divinyl benzene; allyl methacrylate; allyl cinnimate; allyl glycidyl ether; acrylamide; methacrylamide; N-methylol acrylamide; N-methylol methacrylamide; as well as combinations thereof. The use of vinyl, allylic, and acrylamide monomers with the inventive compositions described herein is not preferred, however, due to possible health concerns.

Preferred diluent monomers for the present invention include: hydroxypropyl methacrylate, isobornyl methacrylate, tert-butyl methacrylate, methyl methacrylate, tetrahydrofurfuryl methacrylate, benzyl methacrylate, ethylene glycol dimethacrylate, trimethylolpropane trimethacrylate, tris (2-hydroxyethyl)isocyanurate triacrylate, and trimethylolpropane triacrylate. Tetrahydrofurfuryl methacrylate and trimethylolpropane trimethacrylate are particularly preferred.

Acetoacetoxy Functional Monomer

As indicated above, the use of an acetoacetoxy functional monomer has surprisingly been found to provide an unexpected, beneficial synergistic effect with respect to curing at low temperature when used in the presence of a monomer that contains a cross-linkable silane group. In addition to the main monomer described above, the adhesive compositions of the present invention therefore also comprise an ethylenically unsaturated monomer that contains at least one cross-linkable acetoacetoxy functional group. Acetoacetoxy functionality can be incorporated into the polymer matrix in the inventive adhesives using acetoacetoxy alkyl acrylates such as, but not limited to: acetoacetoxyethyl acrylate; acetoacetoxyethyl methacrylate; diacetone acrylamide; acetoacetoxy vinyl ether; as well as combinations of any of the foregoing. A preferred reactive monomer diluent is acetoacetoxyethyl methacrylate, often abbreviated AAEM.

Silane Monomer

As indicated above, the adhesive compositions of the present invention also comprise an ethylenically unsaturated monomer that contains at least one cross-linkable silane group. Cross-linkable silane groups that are preferred for use with the inventive compositions comprise hydrolizable alkoxy groups. Examples of hydrolizable alkoxy groups that are suitable for use with the present invention may be selected from among: hydroxy group; halogen atom; alkoxy group; and acyloxy group; as well as combinations of any of the foregoing. Silane monomers having alkoxy groups are preferred.

Examples of monomers having both a point of polymerizable unsaturation and a cross-linkable silicon group include: methacryloxypropyl polyalkoxy silanes such as methacryloxypropyl trimethoxysilane, methacryloxypropylmethyl dimethoxy silane and methacryloxypropyl triethoxy silane; acryloxypropyl polyalkyloxy silanes such as acryloxypropyl trimethoxy silane, acryloxypropylmethyl dimethoxy silane, and acryloxypropyl triethoxy silane; vinylalkyl polyalkyloxy silanes such as vinyl trimethoxysilane, vinylmethyl dimethoxy silane and vinyl triethoxy silane; as well as combinations of any of the foregoing.

Curing Agent

Curing agents in the present invention are free-radical initiators used with adhesive compositions in order to initiate polymerization and provide cross-linking of the adhesive. Free radical initiators that are suitable for use with the present invention may be selected from among: peroxides; peracids; peresters; and peroxymaleates; as well as combinations of any of the foregoing. In addition, the adhesive compositions may also be cured by using physical curing techniques such as, but not limited to: radiant energy; thermal energy; as well as combinations thereof. Combinations of free radical initiators with physical techniques may also be appropriate for use with the low temperature adhesive compositions provided herein. Examples of peroxides that are suitable for use with the present invention include, but are not limited to: cumene hydroperoxide; cyclohexanone peroxide; diacyl peroxide; benzoyl peroxide; dibenzoyl peroxide; diisopropylbenzene dihydroperoxide; hydroperoxide; lauryl peroxide; methyl ethyl ketone peroxide; p-butyl hydroperoxide; and mixtures thereof. Dibenzoyl peroxides are preferred peroxides.

Non-reactive diluents are often used with dibenzoyl peroxide to add stability to the product. Examples of non-reactive diluents used to stabilize dibenzoyl peroxide include, but are not limited to: di-n-butyl phthalate; diisobutyl phthalate; dicyclohexyl phthalate; butylbenzylphthalate; trialkylphosphates; triarylphosphates; alkylarylphosphates; alkyl ethers of mono and diethylene glycols, alkyl ethers of mono and dipropylene glycols; benzoates of mono and diethylene glycols; benzoates of mono and dipropylene glycols; water; and the like. Additionally, non-reactive diluents such as ethylene glycol, propylene glycol, glycerol, urea and the like are often used to lower the freezing point of benzoyl peroxide mixtures. In one aspect of the present invention phthalate-free dibenzoyl peroxide mixtures are preferred.

Accelerants

Accelerants may be used with the adhesive compositions of the present invention. As will be understood by those skilled in the relevant art, the accelerant(s) that is appropriate for use with the low temperature adhesive compositions of the present invention will vary, depending upon selection of a free radical initiator. Accelerants that are suitable for curing via free radical mechanism include, but are not limited to organic compounds selected from among: thioamides such as thiourea, acyl thiourea, tetramethyl thiourea, diethylthiourea, dibutyl thiourea, ethylene thiourea, trimethyl thiourea, triphenyl thiourea and trioyl thiourea; mercaptobenzimidazol; tertiary amines such as N,N-dialkyl toluidines, where the alkyl group is selected from among methyl, ethyl, hydroxyethyl, hydroxyl propyl, isopropyl and mixtures thereof; trialkyl amines, where alkyl is selected from among ethyl, propyl, and ethyl diethanol; N,N-dialkylanilines such as N,N-dimethylaniline and N,N-diethylaniline; 4,4-bis(dimethylamino)diphenylmethane; and mixtures thereof.

Inorganic materials as well as organic salts may also be used as accelerants with the present invention. Examples of inorganics and organic salts that are suitable for use with the inventive adhesives include, but are not limited to: magnesium; tin; and certain salts such as cobalt naphthenate. It is also possible to use more than one accelerant with the inventive adhesives. Accordingly, in one aspect, the inventive adhesive compositions may include an organic compound, an inorganic, an organic salt as well as combinations of any of the foregoing.

In the course of the inventive work described herein, it has also been found that formulations including dibenzoyl peroxide also preferably contain an accelerating agent in the first component with the resin and monomers. Accelerators suitable for use herein may be selected from among: N,N-diisopropanol-p-toluidine, N,N-dihydroxyethyl-p-toluidine; N,N-methylhydroxyethyl-p-toluidine; and mixtures of the foregoing.

Fillers

Adhesive compositions that are used for anchoring members often contain fillers to both impart strength and reduce cost. As will be appreciated by those knowledgeable in the relevant art, fillers can also be used to control viscosity. Fillers that are appropriate for use with the present invention include, but are not limited to: silica fume; quartz sand; finely ground quartz; a metal oxide such as magnesium oxide, iron oxide, aluminum oxide, and calcium oxide; clinker; calcium carbonate; metal shavings or particles; barium sulfate; aluminum trihydrate; wollastonite; kaolin clay; mica; feldspar; nepheline syenite; glass beads; corundum; talc; chalk; ceramic microspheres; and cement; in addition to combinations of any of the foregoing. In one aspect, either the first composition or the second composition comprising the inventive adhesives contains at least one filler, which may comprise the same or different fillers. In another aspect, both the first composition and the second composition contain fillers. In yet another aspect of the invention, the first component preferably contains at least one filler that is reactive with water, examples of which include cement and metal oxides. Cement is often a preferred filler, as it ties up water in the adhesive system and allows for better performance when an anchor is exposed to elevated temperatures after cure. As will be understood by those skilled in the relevant art, fillers may be mixed into the first, monomer component and/or the second, curing agent component of the inventive adhesives.

Inhibitors

Inhibitors are required to prevent polymerization of the monomers and resins of the first component during storage. Inhibitors are present in reactive resins and monomers as they are received from manufacturers; however, additional inhibitor is often required to improve shelf life of the final product or to counteract the presence of the accelerator. Polymerization inhibitors appropriate for the present invention include, but are not limited to: methyl hydroquinone, hydroquinone, catechol, hydroquinone monomethyl ether, mono-tert-butyl hydroquinone, di-tert-butyl hydroquinone, p-benzoquinone, 2,5-diphenyl-p-benzoquinone, p-benzoquinone, trimethyl hydroquinone, napthaquinone, di-tert-butyl methylphenol, and combinations of any of the foregoing.

Thixotropic Agents

Thixotropic agents are often used in adhesive compositions to reduce the tendency of the liquid resin to flow or drain from vertical surfaces. Thixotropic agents that are suitable for use with adhesive compositions of the present invention include, but are not limited to: fumed silica, organosilicas, clays and silicic acid. Commercially available fumed silicas that are particularly suitable for use with the present invention are sold under such trademarks as Aerosil® available from Evonik Industries, and Cab-o-Sil® available from Cabot Corp.

Adjuncts

It is recognized that other components or adjuvants known to those skilled in the art may also optionally be included in the inventive adhesive compositions. Such components may include, but are not limited to: antifoaming agents; catalysts; coupling agents; non-reactive diluents; dyes; fillers; fungicides; impact modifiers; odor maskants; pigments; solvents; stabilizers; surfactants; wetting agents; as well as combinations of any of the foregoing.

Formulations

A number of different formulations that included varying amounts of the above active and optional ingredients were prepared and evaluated for curing at low and medium temperatures, and testing at low, medium and high temperatures. The term "low temperature" as used herein is understood to indicate temperatures on the order of approximately $-10°$ C.$\pm 3°$ C. ($14°$ F.$\pm 4°$ F.). The term "medium temperature," "ambient temperature", "standard temperature" or "average temperature" as used herein is understood to refer to room temperature or temperatures of approximately $23°$ C.$\pm 3°$ C. ($72°$ F.$\pm 4°$ F.). The term "high" or "elevated temperatures" as used herein is understood to indicate temperatures on the order of approximately $82°$ C.$\pm 3°$ C. ($180°$ F.$\pm 4°$ F.). Thus, a variety of different reactive main monomers were used in combinations with acetoacetoxy-containing monomers, both with and without monomers that contained silane groups.

Phthalate-Free Compositions

As indicated above, formulations that comprised a reactive resin to which an acetoacetoxy-silane monomer combination was added were found to exhibit remarkably good strength and durability characteristics at room medium temperatures following curing at low temperatures. In many instances, the performance of these inventive adhesive compositions showed nearly a two-fold improvement over other formulations that did not include the acetoacetoxy-silane monomer combination. Even more unexpectedly, however, a further improvement in performance characteristics was observed when adhesive compositions were formulated without the presence of any phthalate moieties. Phthalate-free adhesive compositions of the present invention have surprisingly been found to be especially well-suited for curing at low temperatures. On average, the removal of phthalates from the inventive reactive resin/acetoacetoxy/silane monomer combination resulted in a 10% improvement in performance over adhesive compositions in which phthalates were included.

Phthalates are typically introduced into adhesive compositions with the free radical initiators that are used. According to one aspect of the present invention, therefore, noticeable improvements in adhesive performance can be observed in formulations at standard temperatures following cure at low temperatures when free radical initiators are used in the inventive adhesives that are phthalate-free. Examples of phthalate-free free-radical initiators that are suitable for use with the present inventive include dibenzoyl peroxides. Phthalate-free dibenzoyl peroxides are commercially available under a variety of brand names such as, but not limited to, the Perkadox® series of free radical initiators available from Akzo Nobel and Luperox® series of free radical initiators from Elf Atochem.

EXAMPLES

A number of adhesive compositions were prepared in accordance with the teaching of the present invention for use in comparison to commercially available adhesive compositions. Performance characteristics were evaluated after cure at standard room temperature of $23\pm 4°$ C. ($73\pm 8°$ F.) and at lower temperatures of $-10°$ C. ($14°$ F.) to mimic curing in cold conditions. Test members were prepared as follows. A channel or bore hole was created in a formed or smooth steel-troweled face of a Portland cement-based concrete test member of compressive strength in the range of 25.3 to 28.0 MPa (3,666 to 4,059 psi). The bore hole was made using a rotaryhammer drill with a 17.5 mm (11/16 inch) diameter carbide bit meeting the requirements of American National Standards Institute Bulletin 212.15 (ANSI B212.15, available in the United States from the Cemented Carbide Producers' Association). The bore hole was drilled to a depth of 79.4 mm (3.125 inch) embedment, perpendicular to the test surface. The channel chamber was then cleaned by blowing compressed air at 0.59 MPa (85 psi) into the hole for four seconds, followed by brushing the bore hole for four complete strokes using a nylon brush of greater diameter than the bore hole, followed by blowing compressed air at 0.59 MPa (85 psi) into the hole a second time, also for four seconds. The anchoring adhesive to be tested was then injected into the bore hole in such a manner as to ensure that the bore hole was evenly filled from the bottom of the chamber to a point approximately two-thirds full. A 15.9 mm (5/8 inch) diameter threaded metal rod was then inserted into the adhesive with a slight twisting motion and the adhesive and insert were allowed to cure undisturbed for one hour. After one hour, a load was placed on the metal rod anchors in tension until the point of failure in accordance with test methods in ASTM E488 as modified by ICC-ES Acceptance Criteria AC308. Tensile testing was performed using an in-house confined or restrained tension testing rig using a 13.6 kg (30 ton) hydraulic ram and a 22.7 kg (50 ton) load cell, in compliance with ASTM E488 as modified by ICC-ES Acceptance Criteria AC308. The confined test setup was used to maximize strain on the adhesive while minimizing the risk of concrete failure.

For the evaluation of inventive formulations after cure at lower temperature, another series of smooth-faced, steel-troweled Portland cement-based concrete test members were prepared in a manner identical to the procedure outlined immediately above. The prepared test members were then placed into a controlled temperature chamber maintained at −10° C. (14° F.) and allowed to come to temperature equilibrium over the course of several days. The anchoring adhesive was then injected into the bore hole in the temperature controlled chamber, filling the drilled cavity from the bottom of the bore hole to a point approximately two-thirds full. A 15.9 mm (0.625 inch) diameter threaded metal rod was then inserted into the adhesive with a slight twisting motion and the adhesive and insert were left undisturbed and permitted to cure at −10° C. (14° F.) for twenty-four hours. At the end of that period, the test member was removed from the controlled temperature chamber and allowed to come to room temperature of approximately 23±4° C. (73±8° F.). The anchors were again loaded in tension until the point of failure in accordance with test methods in ASTM E488 as modified by ICC-ES Acceptance Criteria AC308, as indicated above. Tensile testing was performed using a confined or restrained tension test. The confined test setup was used to maximize strain on the adhesive while minimizing the risk of concrete failure.

Tables 1, 2 and 3 below contain the results of tensile tests performed on a variety of adhesive compositions that were cured at different temperatures in the manner described above. The compositions that were evaluated include commercially-available adhesive products as indicated in Table 1. Tables 2 and 3 contain a summary of a number of different formulations that were evaluated during the development of the inventive low-temperature cure compositions described herein.

Specifically and with reference to Table 1, the commercially available adhesives that were evaluated include: 1) HY 150 Max, manufactured by Hilti Aktiengesellschaft of Schaan, Liechtenstein, available in the United States online and through various distributors; 2) AC100+ Gold™, available from Powers Fasteners, Inc., of Brewster, N.Y.; 3) FIS VW from Fischerwerke GmbH and Co. KG of Waldachtal, Deutschland, not available in the United States; and 4) Sikadur® AnchorFix-1, from Sika AG of Baar, Switzerland, and available through various distributors in the United States. Both HY 150 Max and AC100+ Gold™ have approvals in the United States for installations under low temperature cure conditions. HY 150 Max, FIS VW and AnchorFix-1 have approvals in Europe for installations under low temperature cure conditions.

TABLE 1

Test Results for Competitive Products

| | Company | | | |
|---|---|---|---|---|
| Product | Hilti HY150 Max | Powers AC100+ Gold | Fischer FIS VW | Sika Anchorfix-1 |
| Bond Strength After Cure (MPa) | | | | |
| Cure at 23° C., Test at 82° C. | 16.69 | 9.09 | 14.77 | 12.12 |
| Cure at 23° C., Test at 23° C. | 21.95 | 16.32 | 18.62 | 15.44 |
| Cure at −10° C., Test at 23° C. | 14.52 | 9.40 | 10.69 | 9.58 |
| Cure at −10° C., Test at −10° C. | 19.71 | NE[a] | NE[a] | 12.17 |
| Low Temperature vs. Standard Temperature Degree of Cure[b] | | | | |
| | 66.2% | 57.6% | 57.4% | 60.3% |
| Phthalates present? | Yes | Yes | Yes | Yes |

Notes to Table 1
[a]NE—Not Evaluated
[b]This calculated value is the ratio of the strength at 23° C. after cure at −10° C. compared to the strength at 23° C. after cure at 23° C., expressed in percent.

Table 2 contains a summary of representative formulations that were tested over a range of different concentrations combinations. The Examples in Table 2 are comparable in strength to the competitive products shown in Table 1.

TABLE 2

Formulations and Test Results of Example Compositions

| | Example | | | | | |
|---|---|---|---|---|---|---|
| | 1 | 2 | 3 | 4 | 5 | 6 |
| First Component | | | | | | |
| Reactive Resin | 22.4% | 17.5% | 22.3% | 17.1% | 17.1% | 17.0% |
| Diluent monomer | 15.2% | 25.0% | 15.1% | 20.8% | 20.8% | 20.2% |
| Filler | 60.2% | 54.3% | 59.8% | 59.3% | 59.2% | 59.7% |
| Inhibitor | <0.1% | <0.1% | <0.1% | <0.1% | <0.1% | <0.1% |
| Accelerator | 0.2% | 0.3% | 0.8% | 0.3% | 0.4% | 0.6% |
| Miscellaneous[a] | 2.0% | 2.9% | 2.0% | 2.5% | 2.5% | 2.5% |

TABLE 2-continued

Formulations and Test Results of Example Compositions

| | Example | | | | | |
|---|---|---|---|---|---|---|
| | 1 | 2 | 3 | 4 | 5 | 6 |
| Second Component | | | | | | |
| Free radical initiator | 11.9% | 13.0% | 14.8% | 14.6% | 21.3% | 14.5% |
| Nonreactive diluent | 36.9% | 40.2% | 33.0% | 35.6% | 35.7% | 35.6% |
| Filler | 48.0% | 43.5% | 48.9% | 45.6% | 45.9% | 45.3% |
| Miscellaneous[a] | 3.2% | 3.3% | 3.3% | 4.2% | 5.1% | 4.6% |
| Bond Strength After Cure (MPa) | | | | | | |
| Cure at 23° C., Test at 82° C. | 13.04 | 10.31 | 10.99 | 11.05 | 9.57 | 12.88 |
| Cure at 23° C., Test at 23° C. | 15.78 | 10.46 | 16.31 | 15.03 | 15.32 | 21.83 |
| Cure at −10° C., Test at 23° C. | 7.99 | 4.96 | 11.52 | 10.26 | 9.21 | 13.50 |
| Low Temperature vs. Standard Temperature Degree of Cure[b] | | | | | | |
| | 50.6% | 47.4% | 70.7% | 68.3% | 60.1% | 61.9% |
| Phthalates present? | Yes | Yes | Yes | Yes | Yes | Yes |

Notes to Table 2
[a]Selected from among: pigments; thixotropes; dyes and colorants; etc.
[b]This value, calculated for the entries in the table from their bond strengths, is the ratio of the strength at 23° C. after cure at −10° C. compared to the strength at 23° C. after cure at 23° C., expressed in percent.

Following the initial discovery that acetoacetoxy-silane monomers imparted discernable low-temperature cure improvements to the main reactive resins, a series of experiments were conducted using phthalate-free initiators. As these latter adhesive formulations exhibited even more remarkable strength characteristics at medium temperatures following low temperature cure, a number of experiments were conducted in order to evaluate alternate adhesive compositions. The results of these studies are summarized in Table 3 below. Examples A through C of Table 3 represent a preferred aspect of the present invention, in that they provide phthalate-free compositions well-suited for low temperature cure. In examples A and B the phthalate-free radical initiator used was Perkadox® L-40 RPS; and in example C the free radical initiator used was Perkadox® BTW50. Examples D through G represent an alternate aspect of the present invention in which the adhesive composition is not phthalate-free. Perkadox® 40e was used as the free radical initiator in examples D through G.

TABLE 3

Formulations and Test Results for Sample Compositions

| | Example | | | | | | |
|---|---|---|---|---|---|---|---|
| | A | B | C | D | E | F | G |
| First Component | | | | | | | |
| Reactive Resin | 18.0% | 18.0% | 18.0% | 18.0% | 16.8% | 16.8% | 13.6% |
| Acetoacetoxy monomer | 1.7% | 1.7% | 1.7% | 1.7% | 3.2% | 0% | 0% |
| Silane monomer | 0.5% | 0.5% | 0.5% | 0.5% | 0.9% | 0.9% | 1.0% |
| Diluent monomer | 19.4% | 19.4% | 19.4% | 19.4% | 16.8% | 20.0% | 23.3% |
| Filler | 57.3% | 57.3% | 57.3% | 57.3% | 59.2% | 59.2% | 59.3% |
| Inhibitor | <0.1% | <0.1% | <0.1% | <0.1% | <0.1% | <0.1% | <0.1% |
| Accelerator | 0.9% | 0.9% | 0.9% | 0.9% | 0.6% | 0.6% | 0.5% |
| Miscellaneous[a] | 2.4% | 2.4% | 2.4% | 2.4% | 2.5% | 2.5% | 2.3% |
| Second Component | | | | | | | |
| Free radical initiator | 14.5% | 13.3% | 14.6% | 14.5% | 14.5% | 14.5% | 14.6% |
| Nonreactive diluent | 38.5% | 39.0% | 36.9% | 35.6% | 35.6% | 35.6% | 35.9% |
| Filler | 41.9% | 42.9% | 43.7% | 45.3% | 45.3% | 45.3% | 45.5% |
| Miscellaneous[a] | 5.1% | 4.8% | 4.8% | 4.6% | 4.6% | 4.6% | 4.0% |
| Bond Strength After Cure (MPa) | | | | | | | |
| Cure at 23° C., Test at 82° C. | 15.36 | 15.14 | 13.45 | 14.56 | 12.84 | 12.38 | 10.65 |
| Cure at 23° C., Test at 23° C. | 22.28 | 20.77 | 18.98 | 21.49 | 21.55 | 21.07 | 20.35 |
| Cure at −10° C., Test at 23° C. | 21.28 | 20.42 | 18.97 | 19.80 | 19.49 | 18.30 | 16.32 |
| Cure at −10° C., Test at −10° C. | 22.10 | 21.73 | NE[b] | 21.65 | NE[b] | NE[b] | NE[b] |
| Low Temperature vs. Standard Temperature Degree of Cure[c] | | | | | | | |
| | 95.5% | 98.3% | 99.9% | 92.1% | 90.5% | 86.9% | 80.2% |
| Phthalates present? | No | No | No | Yes | Yes | Yes | Yes |

Notes to Table 3
[a]Selected from among: pigments; thixotropes; dyes and colorants; etc.
[b]NE—Not Evaluated
[c]This value, calculated for the entries in the table from their bond strengths, is the ratio of the strength at 23° C. after cure at −10° C. compared to the strength at 23° C. after cure at 23° C., expressed in percent.

A number of different formulations were tried and evaluated for strength and performance characteristics after curing at different temperatures. In one series of experiments, adhesive formulations with different ratios/levels of AAEM and silane were prepared and evaluated. The different combinations that were tested include (expressed in terms of weight % composition): a) 1.67% AAEM with 0.5% silane; b) 1.67% AAEM with 1.5% silane; c) 5% AAEM with 1.67% silane and d) 5 AEM with 1.5% silane). All of the foregoing formulations gave equivalent bond strengths when cured at −10° C. and tested at 23° C.

As a result of the foregoing work and in accordance with one aspect of the present invention, a first component of the low-temperature curable reaction mixtures comprises 30-70% of a mixture comprising at least one reactive resin, at least one acetoacetoxy monomer, and at least one silane monomer, with the balance selected from at least one of: accelerators, diluent monomers, inhibitors, dyes, fillers, pigments, and thixotropic agents; as well as combinations of the foregoing. A second component of the low-temperature curable reaction mixtures comprises 10-25% of a free radical initiator with the balance selected from at least one of: non-reactive diluents, dyes, fillers, pigments, and thixotropic agents, as well as combinations of the foregoing.

Additionally, according to another aspect of the present invention and as a result of the foregoing work, a first component of the low-temperature curable reaction mixtures comprises 30-70% of a phthalate-free mixture comprising at least one reactive resin, at least one acetoacetoxy monomer, and at least one silane monomer, with the balance selected from at least one of: accelerators, diluent monomers, inhibitors, dyes, fillers, pigments, and thixotropic agents; as well as combinations of the foregoing. A second component of the low-temperature curable reaction mixtures comprises 10-25% of a phthalate-free mixture comprising of at least one free radical initiator with the balance selected from at least one of: non-reactive diluents, dyes, fillers, pigments, and thixotropic agents, as well as combinations of the foregoing.

In a preferred aspect of the invention, the first component of the inventive adhesive composition comprises 4 mole ethoxylated bisphenol A dimethacrylate, 2-(acetoacetoxy) ethyl methacrylate, methacryloxypropyl trimethoxysilane; and at least one diluent monomer, and the second component comprises dibenzoyl peroxide. According to another aspect, a first component of the inventive adhesive compositions additionally comprises the reactive diluent monomers tetrahydrofurfuryl methacrylate and trimethylolpropane trimethacrylate. According to yet another aspect of the invention, the second component comprises a phthalate-free dibenzoyl peroxide composition.

Delivery Method

Many methods of delivery for adhesive compositions may be contemplated. For instance, adhesive components may be stored in relatively small amounts in multi-chambered cartridges from which components are dispensed simultaneously. Mixing may take place manually or through a static mixing nozzle. Alternately, the components may be stored separately in large containers and mixed with mechanical dispensers just prior to use. Often, the selection of reactive resin and any diluent monomers may need to reflect the delivery method or tool that will be used to introduce the adhesive into a substrate. Dispensing with manual tools presents challenges, especially for low temperature cure adhesives. It is therefore desirable that the viscosities of such adhesive formulations can be adjusted in order to enable the end user to easily install the adhesive under low temperature conditions. In general, low viscosity reactive resins are preferred for such applications. However, low viscosity can also be achieved through a combination of choice of reactive resin, choice and amount of diluent monomer, and amount of filler. Accordingly, and as will be understood by those skilled in the relevant art, the ingredients of the present invention may be formulated over a wide range in order to meet a variety of viscosity criteria from water-thin to thick paste.

Without limiting the scope of the present invention, in one aspect a delivery method for the inventive adhesive compositions comprises using a dual chamber cartridge to dispense the composition through a static mixing nozzle using a dispensing tool. The dispensing tool can be of any power configuration including, but not limited to manual, electric, battery operated or pneumatic. In one aspect of the present invention, the first and second components are each prepared separately and then combined by mixing their ingredients in a large mechanical mixer. In one embodiment, the components are placed in separated multi-component, side-by-side or coaxial adhesive cartridges for use in the field where they are dispensed through a static mixing nozzle using a dispensing tool.

An alternate delivery method for an adhesive composition prepared according to the present invention may involve delivering the two separate components in the field using dual tank bulk dispensing equipment. Yet another delivery method for an adhesive composition according to the present invention would involve the use of frangible capsules. Thus a first, sealed capsule containing a first component of the inventive formulations may be situated inside a second, larger capsule. The second capsule also contains the second component of the formulation and is also sealed. In the field, such a dual capsule would be placed into a bore hole and broken by either driving an anchor element through the dual capsule or spinning the anchor element into the dual capsule. In such a frangible capsule delivery system, the dual capsules become part of the adhesive and serve as a filler. Regardless of the delivery technique employed, according to one aspect of the present invention, the first and second components are mixed in amounts such that the weight ratio of the first component to the second component is approximately ten to one. In another aspect of the present invention, the first component makes up approximately 91% of the total composition and the second component makes up approximately 9% of the total composition.

In one aspect, the formulations of the present invention improve upon adhesives of the prior art by providing an adhesive formulation that has high internal mechanical strength, high bond strength with the base and the anchor, absorbs little water, has low toxicity, a viscosity appropriate for filling bore holes, and at the same is suitable for curing at low temperatures. In another aspect, the formulations of the present invention, when applied and cured at low temperature, exhibit strength and durability characteristics at both room temperatures and elevated temperatures that are at least equivalent to adhesives that are currently commercially available. That is, equivalent strength and durability characteristics of the instant formulations can be realized both at room temperatures and elevated temperatures as compared to commercially available adhesives, without the need for formulating compositions differently for use at different temperatures. Moreover, the inventive adhesive compositions provide the added advantage that they are phthalate free.

The present invention has been described above in detail with reference to specific embodiments, Tables and Examples. These specific embodiments should not be construed as narrowing the scope of the invention, but rather as illustrative examples. Although preferred embodiments of the invention are specifically disclosed and described above, it is to be understood that various modifications and substitutions are anticipated and may be made to the described compositions, as well as to materials, methods of manufacture and use, without departing from the broad spirit or scope of the invention contemplated herein. The invention is further illustrated and described in the claims, which follow.

What is claimed:

1. A curable adhesive composition, comprising:
   a. at least one reactive resin comprising a polymerizable monomer;
   b. at least one acetoacetoxy functional monomer;
   c. at least one silane monomer;
   d. a free radical initiator; and
   e. an accelerant;
   in which the free radical initiator is dibenzoyl peroxide, and the accelerant is selected from the group consisting: of N,N-diisopropanol-p-toluidine; N,N-dihydroxyethyl-p-toluidine; N,N-methylhydroxyethyl-p-toluidine; and mixtures thereof.

2. The composition of claim 1, wherein the strength of the adhesive at 23° C. after cure at −10° C. compared to the strength of the adhesive at 23° C. after cure at 23° C. is greater than 50%, preferably greater than 60%, more preferably greater than 7.0% and most preferably greater than 80%.

3. The composition of claim 1, wherein after curing at −10° C., the adhesive exhibits a bond strength at 23° C. that is greater than 10 MPa, preferably greater than 12 MPa, more preferably greater than 14 MPa and most preferably greater than 16 MPa.

4. The composition of claim 1, wherein:
   a. the reactive resin is selected from among: acrylate monomers; allylic resins; bismaleimide resins; epoxy acrylate resins; epoxy methacrylate resins; methacrylate monomers; phenolic-based acrylates; phenolic-based methacrylates; unsaturated polyester resins; urethane acrylate resins; urethane methacrylate resins; and vinyl ester resins; as well combinations of any of the foregoing;
   b. the acetoacetoxy functional monomer is selected from among: acetoacetoxyethyl acrylate; acetoacetoxyethyl methacrylate, diacetone acrylamide; acetoacetoxy vinyl ether; as well as combinations of any the foregoing; and
   c. the silane monomer is selected from among: methacryloxypropyl trimethoxysilane; methacryloxypropylmethyl dimethoxy silane; methacryloxypropyl triethoxy silane; acryloxypropyl trimethoxy silane; acryloxypropylmethyl dimethoxy silane; acryloxypropyl triethoxy silane; vinyl trimethoxysilane; vinylmethyl dimethoxy silane; vinyl triethoxy silane; in addition to combinations of any of the foregoing.

5. The composition of claim 1, further comprising:
   f. at least one reactive diluent monomer, where the diluent monomer is selected form among: monofunctional monomers, multifunctional monomers, and combinations of the foregoing; where:
      1) the monofunctional monomer is selected from among: methyl methacrylate; isopropyl methacrylate; isobutyl methacrylate; tert-butyl methacrylate; steryl methacrylate; 2-phenoxyethyl methacrylate; tetrahydrofurfuryl methacrylate; glycidyl methacrylate; isobornyl methacrylate; hydroxyethyl methacrylate; hydroxypropyl methacrylate; hydroxybutyl methacrylate; benzyl methacrylate; dicyclopentyl methacrylate; tert-butyl acrylate; steryl acrylate; 2-phenoxyethyl acrylate; tetrahydrofurfuryl acrylate; isobornyl acrylate; hydroxybutyl methacrylate; benzyl acrylate; dicyclopentyl acrylate; styrene; vinyl toluene; methyl styrene; allyl glycidyl ether; acrylamide; methacrylamide; N-methylol acrylamide; N-methylol methacrylamide; as well as combinations of any of the foregoing; and
      2) the multifunctional monomer is selected from among: divinyl benzene; allyl methacrylate; allyl cinnimate; ethylene glycol dimethacrylate; diethlyene glycol dimethacrylate; triethylene glycol dimethacrylate; dipropylene glycol dimethacrylate; 1,3-butylene glycol dimethacrylate; 1,4-butanediol dimethacrylate; 1,6-hexanediol dimethacrylate; neopentyl glycol dimethacrylate; cyclohexane dimethanol dimethacrylate; dicyclopentyl dimethacrylate; glyceryl trimethacrylate; trimethylolpropane trimethacrylate; pentaerythritol trimethacrylate; pentaerythritol tetramethacrylate; dipentaerythritol pentamethacrylate; ethylene glycol diacrylate; diethlyene glycol diacrylate; triethylene glycol diacrylate; dipropylene glycol diacrylate; 1,3-butylene glycol diacrylate; 1,4-butanediol diacrylate; 1,6-hexanediol diacrylate; neopentyl glycol diacrylate; cyclohexane dimethanol diacrylate; dicyclopentyl diacrylate; glyceryl triacrylate; trimethylolpropane triacrylate; pentaerythritol triacrylate; pentaerythritol tetraacrylate; dipentaerythritol pentaacrylate; tris(2-hydroxy ethyl)isocyanurate triacrylate; alkoxylated versions of any of the foregoing; and metallic acrylates and methacrylates of zinc, magnesium and calcium as well as combinations of any of the foregoing.

6. The composition of claim 1, wherein the polymerizable monomer is an ethoxylated bisphenol A dimethacrylate.

7. The composition of claim 1, wherein the acetoacetoxy functional monomer is acetoacetoxyethyl methacrylate.

8. The composition of claim 1, wherein the silane monomer is methacryloxypropyl trimethoxysilane.

9. The composition of claim 1, wherein the dibenzoyl peroxide is phthalate free.

10. The composition of claim 1, wherein the polymerizable monomer is an ethoxylated bisphenol A dimethacrylate; the acetoacetoxy functional monomer is acetoacetoxyethyl methacrylate; the silane monomer is methacryloxypropyl trimethoxysilane; the dibenzoyl peroxide is phthalate free; and the accelerant is selected from the group consisting of: N,N-diisopropanol-p-toluidine; N,N-dihydroxyethyl-p-toluidine; N,N-methylhydroxyethyl-p-toluidine; and mixtures thereof.

11. A curable adhesive composition, comprising:
   a. at least one reactive resin comprising a polymerizable monomer;
   b. at least one acetoacetoxy functional monomer;
   c. at least one silane monomer;
   d. a free radical initiator; and
   e. an accelerant;

where: the polymerizable monomer is an ethoxylated bisphenol A dimethacrylate; the acetoacetoxy functional monomer is acetoacetoxyethyl methacrylate; the silane monomer is methacryloxypropyl trimethoxysilane; the free radical initiator is phthalate free dibenzoyl peroxide; and the accelerant is selected from the group consisting of: N,N-diisopropanol-p-toluidine; N,N-dihydroxyethyl-p-toluidine; N,N-methylhydroxyethyl-p-toluidine; and mixtures thereof.

12. A curable adhesive composition, comprising:
a. an ethoxylated bisphenol A dimethacrylate;
b. acetoacetoxyethyl methacrylate;
c. methacryloxypropyl trimethoxysilane;
d. phthalate-free dibenzoyl peroxide; and
e. an accelerant selected from the group consisting of N,N-diisopropanol-p-toluidine; N,N-dihydroxyethyl-p-toluidine; N,N-methylhydroxyethyl-p-toluidine, and mixtures thereof.

13. A curable adhesive composition, comprising:
a. an ethoxylated bisphenol A dimethacrylate;
b. acetoacetoxyethyl methacrylate;
c. methacryloxypropyl trimethoxysilane;
d. phthalate-free dibenzoyl peroxide; and
e. N,N-diisopropanol-p-toluidine.

* * * * *